United States Patent [19]
Yoshikawa et al.

[11] Patent Number: 5,775,791
[45] Date of Patent: Jul. 7, 1998

[54] SURFACE EMISSION APPARATUS

[75] Inventors: Yukio Yoshikawa; Shigekazu Nakamura, both of Tokyo, Japan

[73] Assignee: Copal Company Limited, Tokyo, Japan

[21] Appl. No.: 338,580

[22] PCT Filed: Sep. 1, 1993

[86] PCT No.: PCT/JP93/01238

§ 371 Date: Apr. 27, 1995

§ 102(e) Date: Apr. 27, 1995

[87] PCT Pub. No.: WO95/06889

PCT Pub. Date: Mar. 9, 1995

[30] Foreign Application Priority Data

Aug. 31, 1992 [JP] Japan ..................... 4-061246

[51] Int. Cl.$^6$ ............................................. F21V 8/00
[52] U.S. Cl. .................... 362/31; 362/26; 362/327; 362/330
[58] Field of Search ............... 362/31, 26, 330, 362/327; 359/49; 349/62, 65

[56] References Cited

U.S. PATENT DOCUMENTS

| | | | |
|---|---|---|---|
| 4,890,201 | 12/1989 | Toft | 362/31 |
| 4,985,809 | 1/1991 | Matsui et al. | 362/31 |
| 5,070,431 | 12/1991 | Kitazawa et al. | 361/31 |
| 5,377,084 | 12/1994 | Kojima et al. | 362/31 |

FOREIGN PATENT DOCUMENTS

| | | |
|---|---|---|
| 58-17957 | 4/1983 | Japan . |
| 60-75907 | 5/1985 | Japan . |
| 61-145902 | 9/1986 | Japan . |
| 63-208670 | 8/1988 | Japan . |
| 2-126501 | 5/1990 | Japan . |

OTHER PUBLICATIONS

International Search Report for International Application No. PCT/JP93/01238.

*Primary Examiner*—Alan Cariaso
*Attorney, Agent, or Firm*—Merchant, Gould, Smith, Edell, Welter & Schmidt

[57] ABSTRACT

The present invention relates to a surface emission apparatus for causing light, emitting from a light source arranged to a side of a light-emitting surface thereof, to emerge from the light-emitting surface. The surface emission apparatus includes a transparent light-guide plate in which reflecting shape portions formed with small projecting or concaving portions are arranged on its bottom surface portion opposing the light-emitting surface such that a density of the projecting or concaving portions is gradually increased in accordance with a distance from the light source. Light incident from the light source is reflected by the reflecting shape portions and emerges from the light-emitting surface. Since light emerging from the light source is reflected toward the light-emitting surface in accordance with the density of the reflecting shape portions, uniform light emission can be obtained throughout the entire light-emitting surface. Since the reflecting shape portions are formed in a staggered manner in a direction away from the light source, light emitted from the light source can be easily incident on many projecting or concaving portions directly. The reflecting shape portions are preferably small projecting or concaving portions whose contiguous side portions extending from their vertex portions and contiguous to the bottom surface portion are formed with curved surfaces, or small projecting or concaving portions whose contiguous side portions extending from their vertex portions and contiguous to the bottom surface portion form circular cones.

6 Claims, 6 Drawing Sheets

1

SURFACE EMISSION APPARATUS

TECHNICAL FIELD

The present invention relates to a surface emission apparatus used for illuminating, from the back, a liquid crystal display panel or the like serving as a body to be illuminated in, e.g., a liquid crystal television, a potable personal computer, or a wordprocessor.

BACKGROUND ART

Conventionally, in a surface emission apparatus, in order to guide light emitted from a light source to a light-emitting surface, light from the light source is made to be incident on a light-guide plate and emerges toward the light-emitting surface. As the technique to form such a light-guide plate by subjecting a surface of the light-guide plate opposing the light-emitting surface to hairline formation so as to randomly reflect light incident on this surface, thereby efficiently guiding light from the light source to the light-emitting surface, one disclosed in, e.g., Japanese Patent Publication No. 58-17957 is known.

In recent years, however, the size of, e.g., the liquid crystal panel, is increasing, and the area of the light-emitting surface of a surface emission apparatus which serves as the back light of the liquid crystal panel is also increasing. On the other hand, a low-profile surface emission apparatus is demanded to obtain a compact, lightweight system in which a liquid crystal panel or the like is incorporated. When the surface emission apparatus is increased in size at a low profile, in a surface emission apparatus using a conventional light-guide plate, a portion of the light-emitting surface closer to the light source is bright while a portion thereof farther from the light source is dark since light does not easily reach there, leading to a non-uniformity in brightness of the light-emitting surface. Thus, it is difficult to obtain light emission with entirely uniform brightness.

As an improvement over this drawback in the surface emission apparatus, a technique disclosed in, e.g., Japanese Patent Laid-Open No. 2-126501 is known, which uniforms the brightness of the light-emitting surface by printing an ink dot pattern on a surface of the light-guide plate opposing the light-emitting surface such that the farther from the light source, the higher the dot density.

When an ink or the like is printed in this manner, however, it is difficult to completely eliminate absorption of light by the ink itself, leading to a decrease in emission efficiency. Also, since a step of printing the ink is needed, the manufacturing process is complicated, leading to an increase in cost.

The present invention has been made in view of the above conventional techniques, and has as its object to provide a surface emission apparatus capable of uniformly emitting light of the light source by uniformly emitting light toward the entire light-emitting surface.

2

Figure 5:
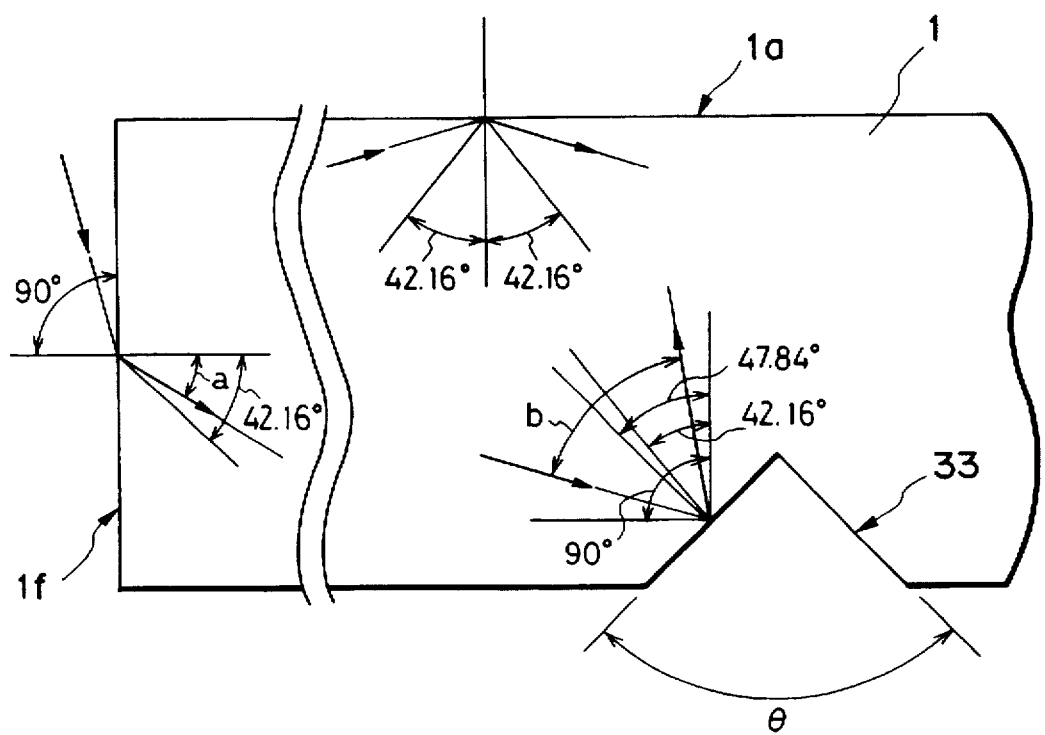
Figure 6A:
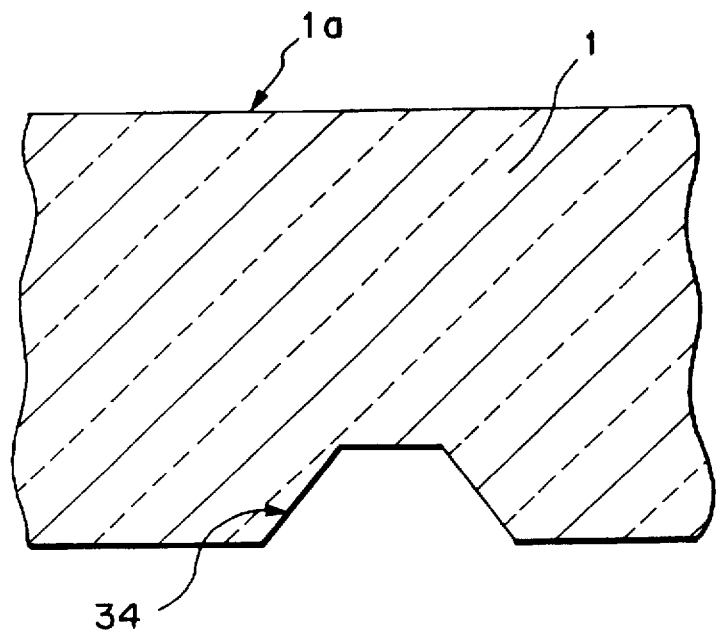
Figure 6B:
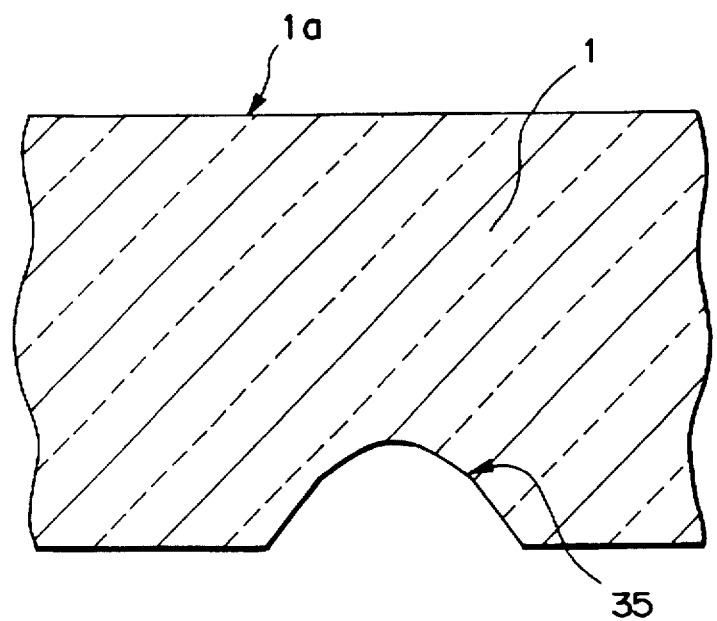

FIG. 5 is a sectional view showing a light-guide plate according to another embodiment of the present invention; and FIGS. 6(A) and 6(B) are sectional views showing projecting portions formed on the bottom surfaces of light-guide plates according to other embodiments.

DISCLOSURE OF INVENTION

In order to achieve the above object, according to the present invention, there is provided a surface emission apparatus for causing light, emitted from a light source arranged on a side of a light-emitting surface thereof, to emerge from the light-emitting surface, comprising a transparent light-guide plate in which reflecting shape portions formed with small projecting portions are arranged on a bottom surface portion thereof opposing the light-emitting surface such that a density of the projecting portions is gradually increased in accordance with a distance from the light source. Light incident from the light source is reflected by the reflecting shape portions and emerges from the light-emitting surface. With this arrangement, light emitted from the light source is reflected toward the light-emitting surface in accordance with the density of the reflecting shape portions, so that uniform light emission can be obtained throughout the light-emitting surface.

Preferably, the reflecting shape portions are disposed in a staggered manner in a direction to be remote from the light source. With this arrangement, light emitted from the light source can be easily incident on many projecting portions directly.

Preferably, the reflecting shape portions are small projecting portions whose contiguous parts extending from vertex portions thereof and contiguous to the bottom surface portion are formed with curved surfaces. Alternatively, the reflecting shape portions are small projecting portions whose contiguous parts extending from vertex portions thereof and contiguous to the bottom surface portion form circular cones, and preferably are circular cones whose vertex angle satisfies a range of 90° to 140°. In ether case, the projecting portions of the reflecting shape portions can be integrally formed in the process, so that any post-process is not needed.

BEST MODE OF CARRYING OUT THE INVENTION

Preferable embodiments of the present invention will be described in detail with reference to the accompanying drawings.

Figure 1:
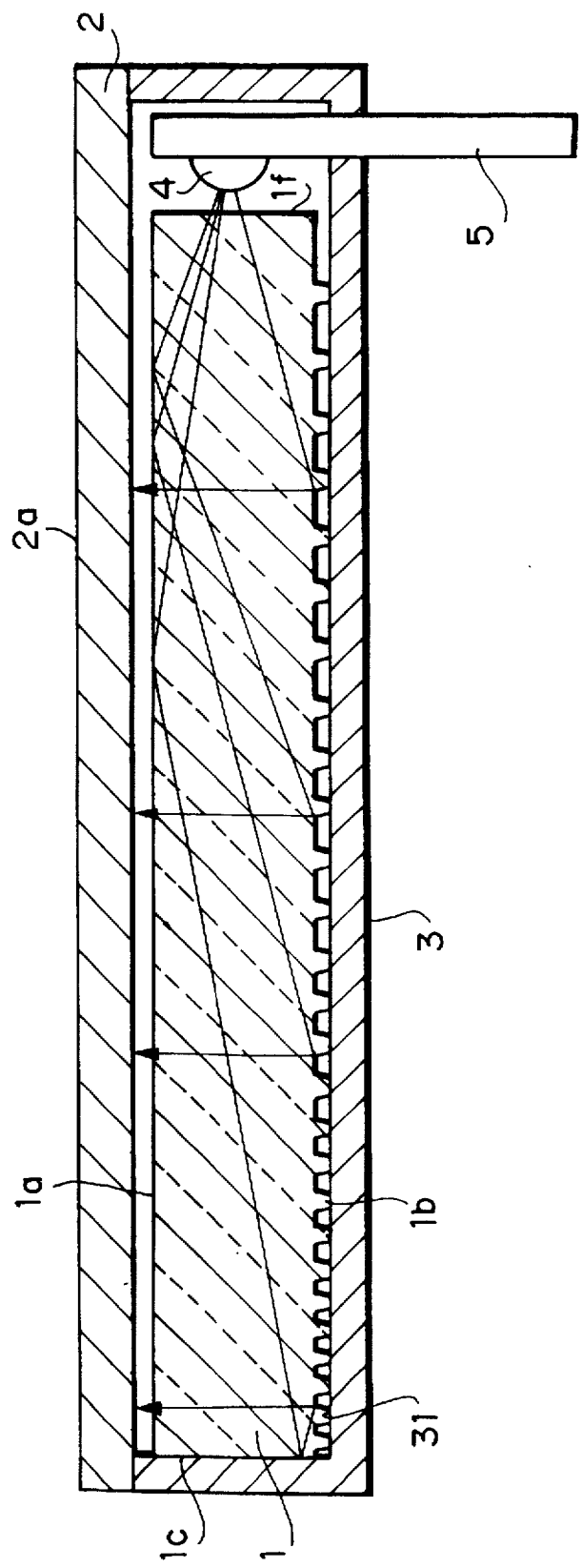
FIG. 1 is a sectional view of a surface emission apparatus according to an embodiment of the present invention.
Figure 2:
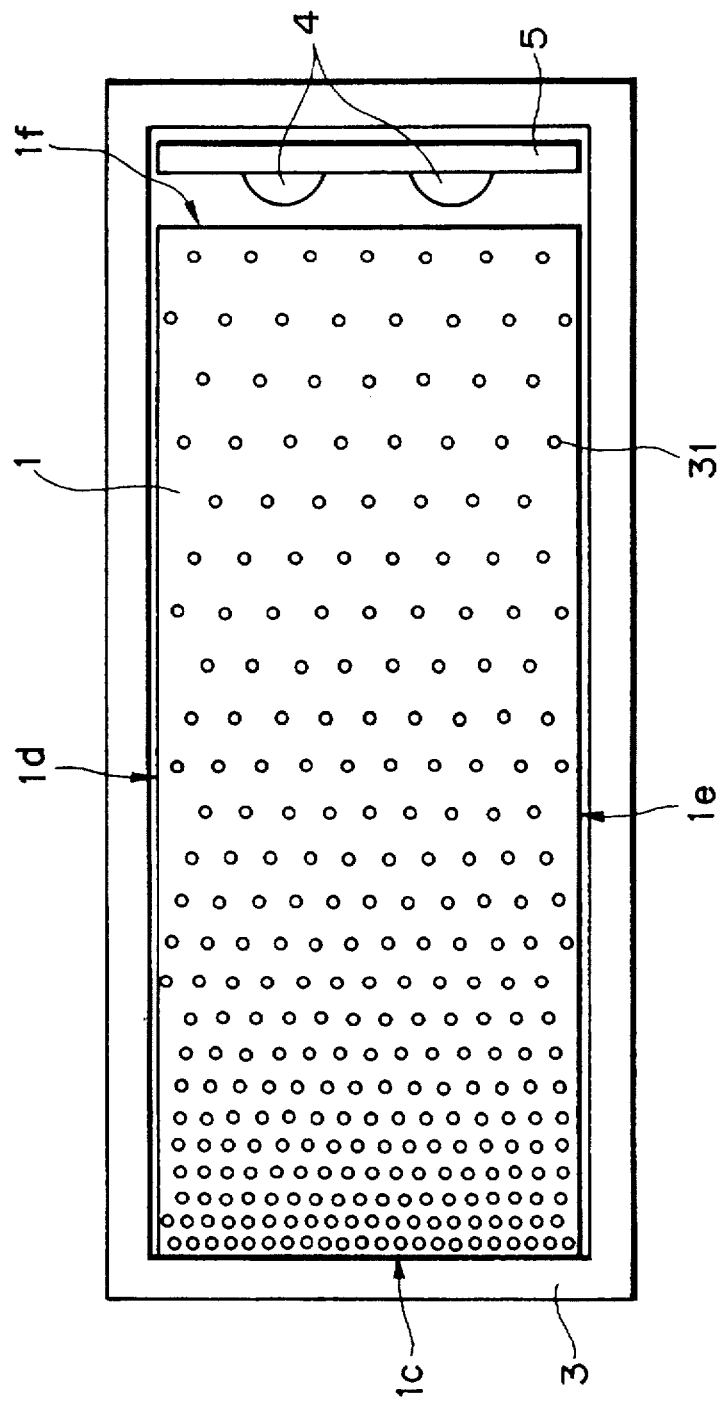
FIG. 2 is a plan view of the surface emission apparatus.
Figure 3:
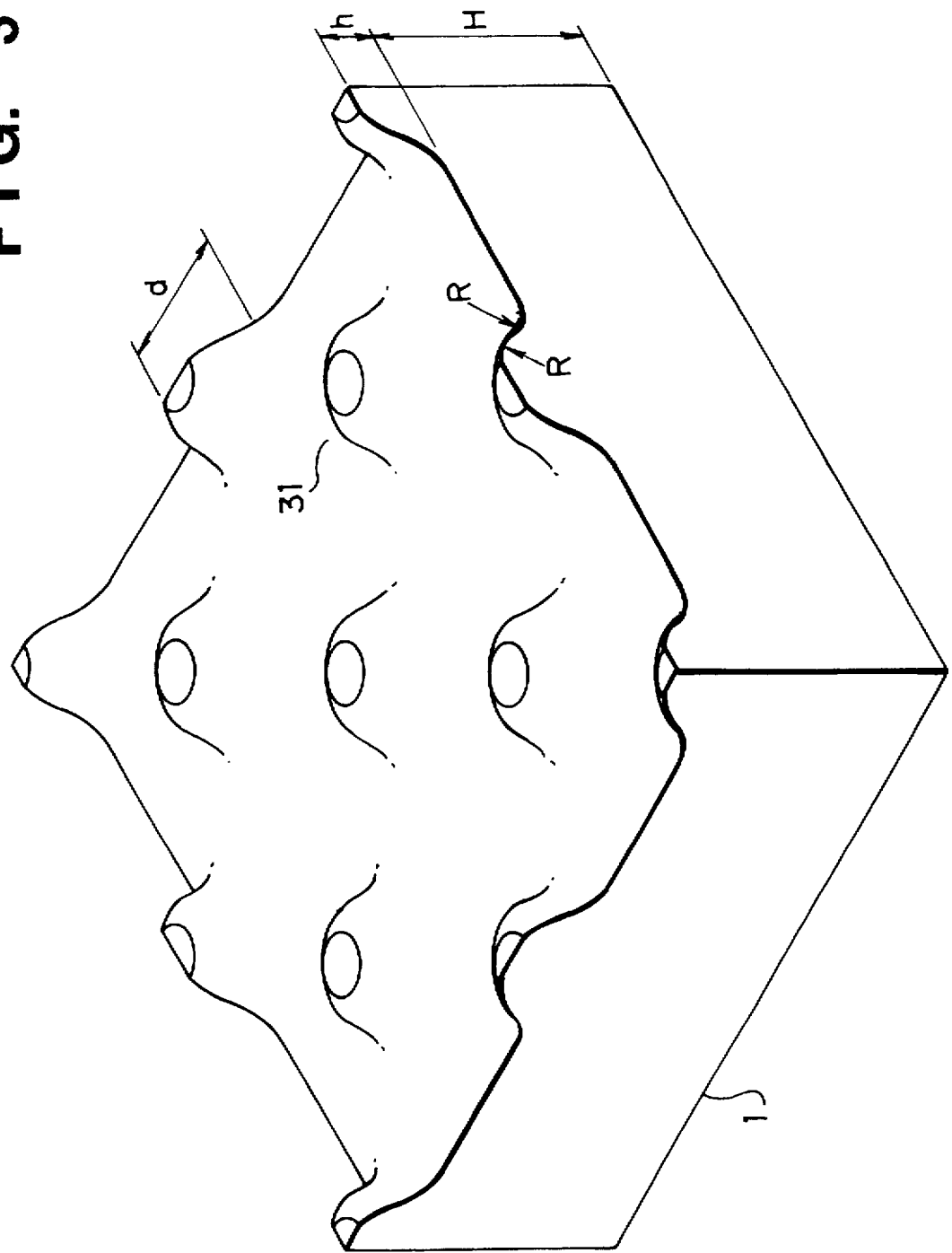
FIG. 3 is an enlarged view of the bottom surface of a light-guide plate.

FIG. 1 is a sectional view of a surface emission apparatus according to an embodiment of the present invention. Referring to FIG. 1, a light source 4 is mounted on a board 5, and a light-guide plate 1 made of a transparent member, e.g., an acrylic member, is disposed close to the board 5 such that light from the light source is incident on it through its end face 1f. The surfaces of the light-guide plate 1 excluding its upper surface 1a on the light-emitting surface side are covered with a reflection frame 3. The surfaces of the light-guide plate 1 excluding its bottom surface 1b opposite the upper surface 1a are smoothed. Small projecting portions 31 whose sections parallel to the bottom surface are circular are formed on the bottom surface 1b of the light-guide plate 1 to be integral with the light-guide plate 1. The vertex surface of each projecting portion 31 is flat. As shown in FIG. 3, the leading and trailing portions extending from the vertex of each projecting portion 31 and contiguous to the bottom surface portion form a curved surface having a radius R. The projecting portions 31 are formed as shown in FIG. 2.

A diffusion plate 2 is mounted above the upper surface 1a of the light-guide plate 1. The diffusion plate 2 is made of ground glass or the like, and diffuses light emerging from the upper surface 1a of the light-guide plate 1 to illuminate a body to be illuminated (not shown) by its light-emitting surface 2a.

FIG. 3 is a partial enlarged perspective view of the bottom surface 1b of the light-guide plate 1. Each small projecting portion 31 is a reflecting shape portion that reflects light from the light source. The cross-section of each projecting portion 31 is circular, and the outer circumferential portion of each projecting portion 31 contiguous to the light-guide plate 1 forms a funnel having a curved surface with the radius R (this curved portion will be referred to as an edge portion hereinafter).

Figure 4:
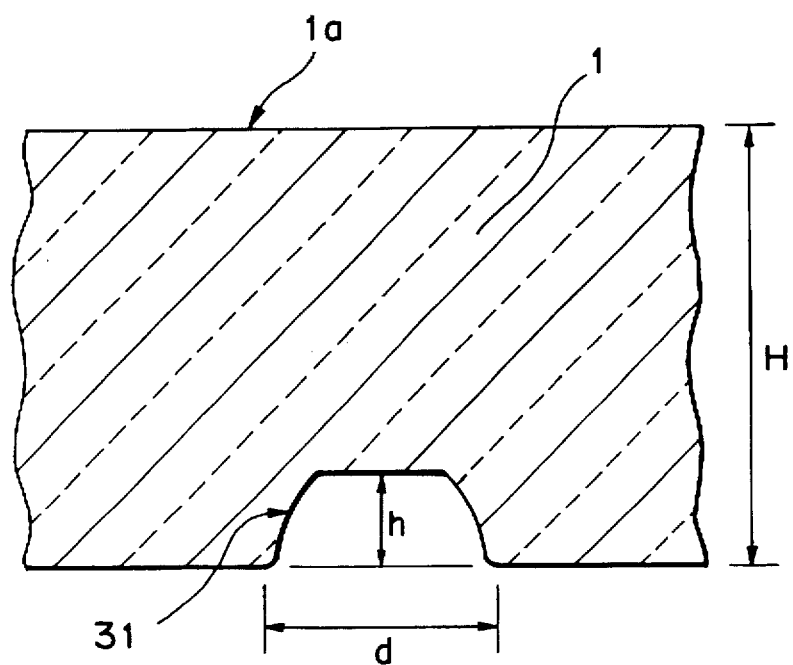
FIG. 4 is a sectional view showing a projecting portion formed on the bottom surface of the light-guide plate shown in FIG. 3.

FIG. 4 shows an enlarged sectional view of the projecting portion 31. Regarding the size of the projecting portion 31, a height h of each projecting portion is about 0.03 to 0.07 mm whereas a thickness H of the light-guide plate 1 is about 1 mm, and a diameter d of each projecting portion is about 0.05 to 0.2 mm. All the projecting portions have the same shape.

FIG. 2 is a plan view of the surface emission apparatus of this embodiment, from which the diffusion plate 2 is removed. Referring to FIG. 2, each small circle is a small projecting portion 31. The projecting portions 31 are arranged in a staggered manner in a direction to be remote from the light source 4. Regarding the density of the projecting portions 31 formed on the light-guide plate 1, it is gradually increased in accordance with an increase in distance from the light source.

Light emitted from the light source is incident on the light-guide plate 1 through its end face 1f opposing the light source 4. When the light-guide plate is made of an acrylic resin, a refractive index n of the acrylic resin is n=1.49, or the critical angle with which the incident light is totally reflected by the interface of the light-guide-plate is 42.16°. Light incident through the end face 1f and refracted is totally reflected when it impinges on the upper surface 1a, surfaces 1d and 1e, or the flat portion of the bottom surface 1b, of the light-guide plate 1 at an angle equal to or more than the critical angle, and will not leak to the outside. When light impinges on an end face 1c, it is reflected by the reflection frame 3.

In this manner, light incident on the light-guide plate 1 impinges on the edge portions of the projecting portions 31 of the bottom surface 1b directly or after repeating total reflection described above. The edge portions form curved surfaces, as described above. Light impinging on the edge portions is reflected and emerges from the upper surface 1a, is diffused by the diffusion plate 2, and emerges from the light-emitting surface 2a.

Since light emerging from the light-guide plate 1 is reflected by the edge portions of the projecting portions 31, as described above, the higher the density of the projecting portions 31, the larger the quantity of light emerging from the upper surface 1a near the projecting portions 31. Therefore, when the density of the projecting portions 31 is gradually increased in accordance with the increase in distance from the light source 4, so that the quantity of light decreasing in accordance with the increase in distance from the light source 4 is corrected, the quantity of emerging light is decreased near the light source where the quantity of incident light is large, and the quantity of emerging light is increased at portions where the quantity of incident light is small, thereby uniforming the quantity of light emerging from the upper surface 1a of the light-guide plate 1.

When the small funnel-type projecting portions whose leading and trailing portions form curved surfaces are arranged on the bottom surface of the light-guide plate 1 in this manner such that the density is decreased in accordance with the increase in distance from the light source, the following effects can be obtained:

① Since the circular projecting portions are arranged, light from any directions can be reflected with the same reflectance without any directivity regardless of the shapes of the projecting portions, thereby obtaining optical uniformity.

② Since the projecting portions have the same shape, the reflectance can be controlled by the density of the projecting portions, thereby uniforming the quantity of light of the surface-emission light source.

③ Since the projecting portions are arranged in the staggered manner, light emitted from the light source can be easily incident on many projecting portions directly, thereby obtaining optical uniformity without increasing the brightness at a particular portion.

④ This light-guide plate can be manufactured at a low cost by integrally forming the projecting portions in the process without requiring any post-process such as hairline formation.

FIG. 5 shows another embodiment of the present invention. FIG. 5 is a sectional view showing a light-guide plate of a surface emission apparatus according to this another embodiment. This embodiment is different from the above embodiment in the shape of the projecting portions, and other portions have the same structure as that of the above embodiment. Thus, the same reference numerals are used to denote the same portions, and a detailed description thereof will be omitted.

As shown in FIG. 5, each projecting portion 33 forms a circular cone such that its section parallel to the bottom surface is circular. As is apparent from FIG. 5, the leading and trailing portions extending from the vertex of each projecting portion 32 and contiguous to the bottom surface portion, i.e., the edge portion of each projecting portion, has a linear section having a predetermined vertex angle θ.

The optical path of light emitted from a light source 4 and incident on a light-guide plate 1 when the projecting portions 33 are circular cones in this manner will be described.

As described above, when the light-guide plate 1 is made of an acrylic resin, the critical angle is 42.16°. Light emitted from the light source 4 and incident on the light-guide plate 1 through an end face 1f has an angle a of incidence of 0° to 42.16° in the light-guide plate. Thus, light emitted from the light source and directly reaching the projecting portion 33 through the end face 1f without being reflected by other surfaces of the light-guide plate has an angle b of 47.84° (=90–42.16) to 90°.

When the vertex angle θ of the projecting portion 33 is set such that the projecting portion 33 reflects light with its edge portion in a direction perpendicular to a light-emitting surface 1a of the light-guide plate 1, it falls within a range of 90° to 132.16° (=90–47.84/2)/2).

As the critical angle of the light-guide plate 1 is 42.16°, light emitted from the light source 4, passing through the end face 1f, reflected by another surface (e.g., a surface within the light-emitting surface 1a) of the light-guide plate 1, and reaching the edge portion of the projecting portion 33 has an angle b of 42.16° to 90°. Therefore, when the vertex angle θ of the projecting portion 33 is set such that the projecting portion 33 reflects light with its edge portion to be perpendicular to the light-emitting surface 1a of the light-guide plate 1, it falls within the range of 90° to 137.85° (=90–42.16/2)/2).

From the foregoing, it is preferable that the vertex angle θ of the projecting portion 33 be set within the range of 90° to 140°. More preferably, when calculation is performed under an assumption that the average angle of light reaching the projecting portion 33 is 68.92° (=(90+48.74)/2), the vertex angle θ will be 111.08°. Thus, the vertex angle of the projecting portion 33 is preferably about 110°.

Circular conical projecting portions 34 having flat vertex portions may be employed, as shown in FIG. 6(A), or circular conical projecting portions 35 having vertex portions with curved surfaces may be employed, as shown in FIG. 6(B).

In this manner, when the small funnel-like circular conical projecting portions, whose leading and trailing portions have a linear section, are arranged on the bottom surface of the light-guide plate 1 such that the density of the projecting portions is decreased in accordance with the increase in distance from the light source, effects ① to ④ similar to those of the first embodiment described above can be obtained, and the rate of light reflected by the projecting portions to be perpendicularly directed toward the light-emitting surface can be increased, so that the brightness before the light-emitting surface can be increased.

In the first and other embodiments described above, the light source 4 is arranged such that light is incident on one end face of the light-guide plate 1. However, when a large light-guide plate 1 is used, light sources can be arranged at the two ends of the light-guide plate 1. In this case, the projecting portions are arranged on the bottom surface of the light-guide plate 1 with a density gradient such that the density is the highest at the central portion of the bottom surface which is farthest from the two light sources and is low near the light sources. With this arrangement, a uniform surface emission apparatus can be realized.

Furthermore, in any of the above embodiments, in formation of the projecting portions, recesses are formed in the light-guide plate 1 so that the vertices of the projecting portions are directed to the light-emitting surface 1a. However, the projecting portions may be formed such that their vertexes are directed to the reflection frame 3 opposite the light-emitting surface. In this case as well, effects substantially similar to those of the above embodiments can be obtained.

Industrial Applicability

As has been described above, with the surface emission apparatus according to the present invention, light from the light source can be uniformly emitted toward the entire light-emitting surface to obtain uniform light emission at a low cost without requiring a complicated structure.

We claim:

1. A surface emission apparatus characterized in that light emitted from a light source arranged near a side portion of a flat light-emitting member thereof emerges from a flat light-emitting surface of said flat light-emitting member, comprising:

a transparent light-guided plate in which reflecting shape portions formed with small projecting portions each with a circular cone having predetermined vertex angle are arranged on a bottom surface portion thereof opposing said flat light-emitting surface such that a density of said projecting portions is gradually increased in accordance with a distance from said light source and also being formed in a staggered manner along parallel lines with respect to said side portion;

said small projecting portions being formed to have small curved surfaces at top end corners of the vertex angles thereof and also being formed to have small curved surfaces at bottom portions thereof so as to continue with said bottom surface portion;

wherein light incident from said light source is reflected by said reflecting shape portions and emerges from said flat light-emitting surface.

2. A surface emission apparatus according to claim 1, wherein said small projecting portions are formed with circular cones whose vertex angles are between a range of 90 to 140 degrees.

3. A surface emission apparatus according claim 1, wherein said transparent light-guide plate including said small projecting portions is made of acrylic resin.

4. A surface emission apparatus characterized in that light emitted from a light source arranged near a side portion of a flat light-emitting member thereof emerges from a flat light-emitting surface of said flat light-emitting member, comprising:

a transparent light-guide plate in which reflecting shape portions formed with small concaving portions are arranged on a bottom surface portion thereof opposing said flat light-emitting surface such that a density of said concaving portions is gradually increased in accordance with a distance from said light source and also being formed in a staggered manner along the parallel lines with respect to said side portion;

said small concaving portions being formed to have small curved surfaces at top end corners thereof and also being formed to have small curved surfaces at bottom portions thereof so as to continue with said bottom surface portion;

wherein light incident from said light source is reflected by said reflecting shape portions and emerges from said flat light-emitting surface.

5. A surface emission apparatus according to claim 4, wherein said small concaving portions are formed with circular cones whose vertex angle is between a range of 90 to 140 degrees.

6. A surface emission apparatus according to claim 4, wherein said transparent light-guide plate together with said small concaving portions is made of acrylic resin.

* * * * *